United States Patent [19]

Hatamura

[11] Patent Number: 4,520,679
[45] Date of Patent: Jun. 4, 1985

[54] LOAD CONVERTER

[76] Inventor: Yotaro Hatamura, 2-12-11 Kohinata, Bunkyo-ku, Tokyo, Japan

[21] Appl. No.: 433,109

[22] Filed: Oct. 6, 1982

[51] Int. Cl.³ .............................. G01L 5/16; G01L 1/22
[52] U.S. Cl. .................................. 73/862.04; 73/862.65
[58] Field of Search ........... 73/862.04, 862.05, 862.06, 73/862.49, 862.65, 147, 862.62, 862.63, 862.64; 308/24; 338/5, 47; 267/158, 160

[56] References Cited

U.S. PATENT DOCUMENTS

| 3,222,628 | 12/1965 | Pien | 73/862.65 X |
| 3,422,445 | 1/1969 | Jacobson | 73/862.65 |
| 3,879,995 | 4/1975 | Libertiny | 73/862.04 |
| 4,361,344 | 11/1982 | Hull et al. | 73/862.04 X |

FOREIGN PATENT DOCUMENTS 0800733  1/1981  U.S.S.R. ........................... 73/862.04

OTHER PUBLICATIONS

Konczakowski, "Strain–Gauge Type dynamometer-Two Component Cutting Forces" Pomiary Autom Kontr (Poland) vol. 18, No. 6, 6/1972, p. 244-245.

Primary Examiner—Charles A. Ruehl
Attorney, Agent, or Firm—Wenderoth, Lind & Ponack

[57] ABSTRACT

A load converter in which part of a detecting block has a through-hole therein to facilitate deformation by a load. The through-hole is a slender or longitudinal hole, which is formed by cutting off a part between two small round holes so that the round holes are connected with each other.

11 Claims, 11 Drawing Figures

FIG. 1-A
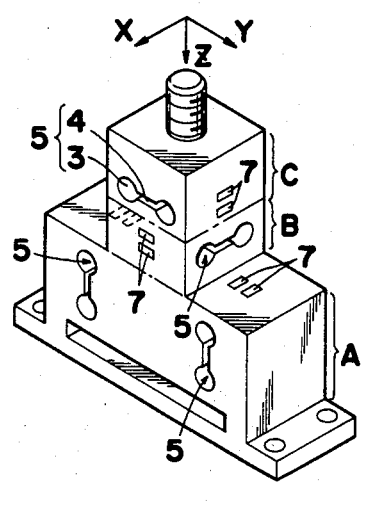
FIG. 1-B
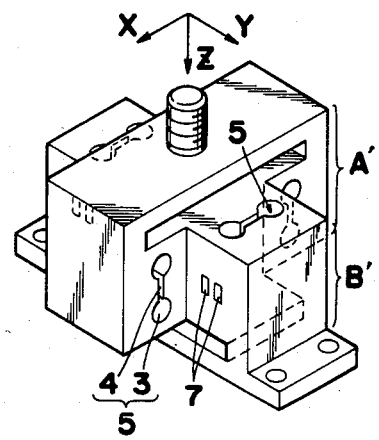
FIG. 2-A
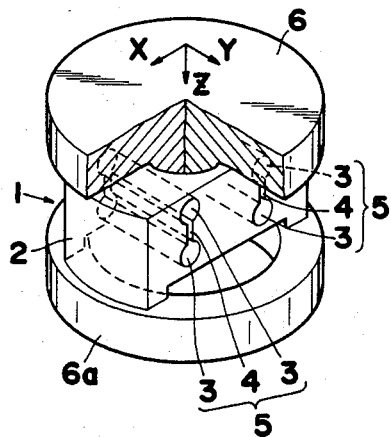
FIG. 2-B
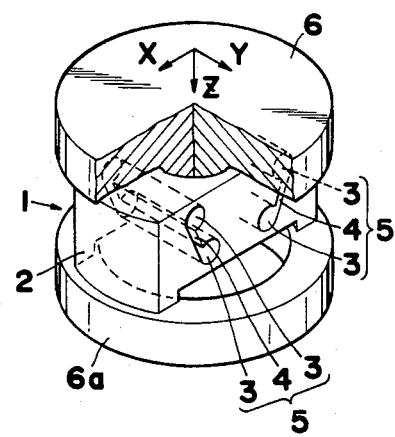

FIG. 7
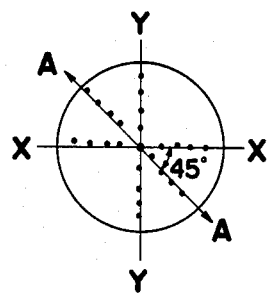
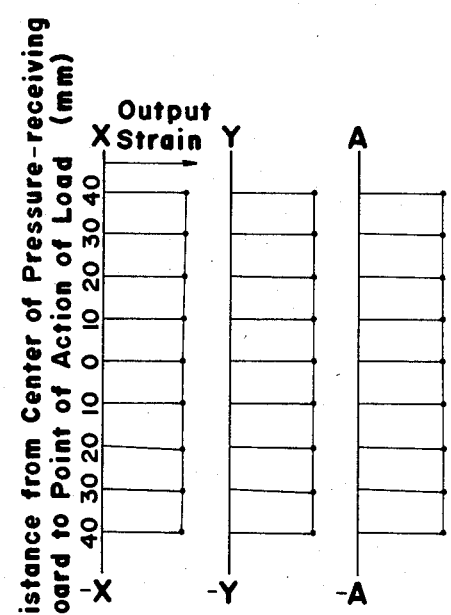

LOAD CONVERTER

BACKGROUND OF THE INVENTION

The present invention relates to a load converter of a type wherein a through-hole is formed so that a specified part of a detecting block alone is easy to deform by a load received.

The load converter of this kind has been provided so far for experimentation and studies and so forth. Recently, however, it has come to be used as a sensor for achieving automation in various fields of technology and, in this connection, new technological problems, such as, in particular a problem of rigidity of a place of deformation and a problem of easiness of manufacture, have arisen. Japanese patent application No. 53-32109, filed Mar. 20, 1978 by the present inventor, discloses a load converter having a parallel flat-board structure obtained by boring a square through-hole in the detecting block. It is true that this load conventer having the parallel flat-board structure is featured by excellent linearity of a strain output, but, on the other hand, it has been impossible, even if desired, to mount the converter directly on a rotating shaft of a machine tool and the like as a sensor to, for instance, replace a conventional cutting dynamometer, because, first of all, it is not suitable for mass production because of troubles in manufacturing it and because it has such shortcomings as a relatively large interference due to its dimensional precision and as insufficient rigidity of the place of deformation.

OBJECTS AND SUMMARY OF THE INVENTION

An object of the present invention is to provide a new load converter which can eliminate the aforesaid disadvantages inherent to the known device.

Another object of the present invention is to provide a load converter which meets with mass production requirements.

Another object of the present invention is to provide a load converter which can provide an excellent linearity of strain output.

A further object of the present invention is to provide a load converter which presents minimum interference due to its dimensional precision.

An additional object of the present invention is to provide a load converter with sufficient rigidity at the place of deformation.

Another object of the present invention is to provide a load converter which permits a direct mounting to a rotating shaft of a machine tool.

Another important object of the present invention is to provide a load converter with improved shape of through-holes, the holes being made for facilitating deformation by a load.

Briefly, the load converter according to the present invention has a structure in which only part of a detecting block is formed with a through-hole therein, and in which the through-hole is a slender hole made by cutting off a part between two round holes so that the round holes are connected.

The detecting block may have three parts which generate strain outputs against different loads in different directions. The three parts are constructed monolithically and in lamination.

The detecting block may have two parts for generating strain outputs against different loads in the different directions, and the two parts may be constructed monolithically such that the two parts cross each other.

The detecting block may have a cylindrical block portion which is disposed intermediate a circular base plate and a pressure-receiving board. The through-holes may be parallel, or may be formed inclined towards an axis of the block.

The detecting block may have grooves at constant intervals on the longitudinal outer surface to form outwardly and radially extended portions, and a through-hole formed in the extended portions between the adjacent grooves. This permits a ready and separate detection of loads in different directions.

If desired, a through-hole extending axially is formed at a center of the block, and a through-hole extending radially is formed at each recessed portion confined by the above-described extended portions.

The present inventor has so far repeated studies on the effeect of R-parts given to four conrners of a square hole based on the experiments thereon. It is needless to say the R=0 means a complete square hole. However, R=5 mm in the case when each side is 10 mm long means a complete round hole, and in this case, it can no longer be said that the structure is the parallel flat-board one. The results of a number of experments have made it clear: (A) that the round hole is nearly the same as the square one in terms of strain output per unit amount of displacement, since the rigidity of the round hole is higher than that of the square one, although the strain output in the former is smaller than that in the latter; (B) that the vertical strain distribution against a load in the direction in which the output is generated, in the vicinity of the boundary between the part of the detecting block wherein the round hole is made and the supporting part thereof having no relation with the round hole, shows nearly the same strain output in a wide range in comparison with the case of the square hole; (C) that the vertical strain distibution against a load in the direction in which the interference is caused in the vicinity of the aforesaid boundary is nearly the same with that in the case of the square hole; and (D) that the round hole which is easier to make than the square one beyond comparison compares quite well with the latter in its performance when it is adopted in place of the latter. However, a structure wherein a place easy to deform is formed by making a single round through-hole in the detecting block is liable not to meet various demands that the effect of a bending moment be reduced, that an expected aim be achieved without losing the rigidity or that, on the contrary, the large strain output be attained even with less rigidity, according to the use of the pertinent apparatus. So as to settle this problem, a through-hole is formed in the detecting block by connecting two round holes by a connecting hole, which has brought about complete elimination of the disadvantage of the aforesaid structure of the single round hole.

Other objects and features of the present invention will become apparent from the detailed description of preferred embodiments thereof, which will be made with reference to the accompanying drawings.

BRIEF DESCRIPTION OF THE DRAWINGS

FIG. 1-A is an explantory drawing illustrating one mode of the present invention.

FIG. 1-B is an explanatory drawing illustrating one variant of the above.

FIGS. 2-A and 2-B and FIGS. 3 and 4 are explanatory drawings showing other modes, respectively.

FIGS. 6A, 6B, 7A and 7B are graphic charts showing the calibration curve and the eccentric load characteristic of the embodiment in FIG. 5.

DETAILED DESCRIPTION OF THE PREFERRED EMBODIMENTS

Figure 3:
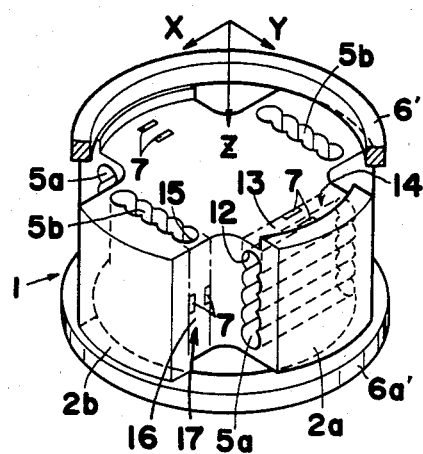

A detecting block 1 illustrated in FIG. 1-A is constituted monolithically of the following parts formed in lamination: a part A of the detecting block generating a strain output against a load in the direction Z, a part B of the detecting block generating a strain output against a load in the direction X, and a part C of the detecting block generating a strain output against a load in the direction Y. Each of the parts B and C of the three parts A, B and C of the detecting block are prepared by making in a cantilever a corresponding through-hole 5 in such a manner that two small round holes 3 are made and that a portion between the holes is cut off to form a connecting hole 4, so that the deformation is made in such a manner that the center of gravity is transferred in parallel under the pressure. In contrast to the parts B and C, the part A of the detecting block prepared by making two through-holes 5 in a beam with both ends built into a base seems to differ from the parts B and C substantially. However, if this beam is divided into two portions at a point of action of a force, it can be said that this beam is formed by uniting two cantilever-like parts of the detecting block horizontally, and the intermediate portion of the beam formed between the two through-holes 5 is deformed under the pressure in a parallel-transfer fashion.

Since there is no substantial difference between the cantilever type, and beam with both ends built-in type structures as aforesaid, the structure can be altered properly from the cantilever type to the beam with both ends built-in type and vice versa according to the conditions of design. For instance, a part B of the detecting block of the beam with both ends built-in type shown in FIG. 1-B, which is equivalent to the part B of the detecting block of cantilever type illustrated in FIG. 1-A, is constituted monolithically with a part A of the detecting block equivalent to the part A of the detecting block, in such a manner that the two parts cross each other. In addition, another detecting block, not shown, can be formed by uniting the part B in FIG. 1-B and the part A in FIG. 1-A into one block in a beam with both ends built-in, whereby a detecting block which is lower in height is prepared. An example illustrated in FIG. 2-A is the one formed to be cylindrical by constituting monolithically a straight gate-shaped part 2 (having a rectangular cross section in the YZ plane) of the beam with both ends stretching over and built-into (formed integrally with) a circular (annular) base part 6a and further by forming monolithically a pressure-receiving disc-shaped board part 6 fixed to the center of the upper side of the above-mentioned part 2, so as to generate thereby an output against a load in the direction Z. It is not an indispensable requirement to make the two through-holes 5 parallel to the direction Z and thus it may be quite well, for instance, that the holes are inclined to the direction Z as an example shown in FIG. 2-B.

Figure 5:
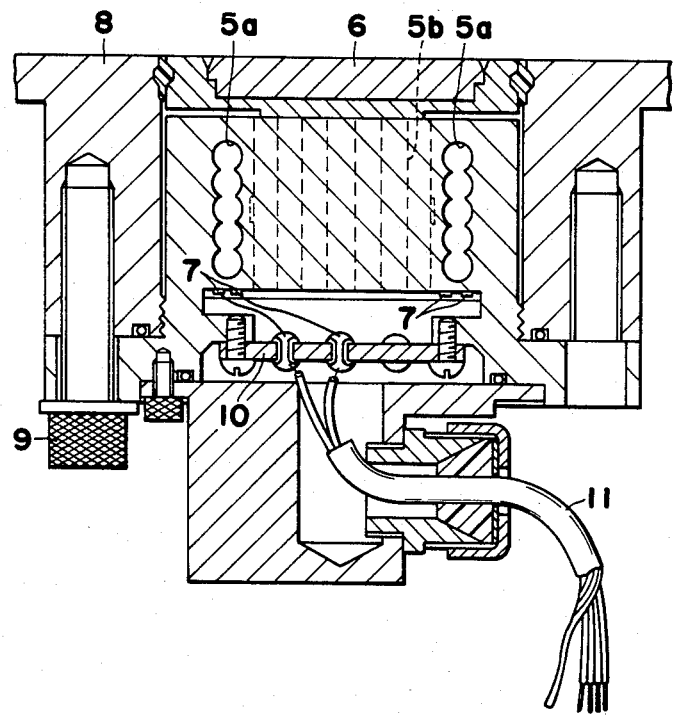
FIG. 5 is a sectional view illustrating an embodiment based on FIG. 3.

A pressure-receiving board part 6' of an example shown in FIG. 3 is formed to be circular in the same way as a base part 6a', and a part 2a of the beam with both ends built-in joined to this circular pressure-receiving board part 6' and a part 2b of the beam with both ends built-in joined to the circular base part 6a' are made to cross each other to be constituted monolithically, and strain outputs in the directions Z and Y are generated by through-holes 5a and 5b made in parts 2a and 2b of the above-mentioned beam, respectively. This example is identical with that in FIG. 1-B in this regard. As is illustrated in FIGS. 3 and 5, each of the holes 5a has opposite cylindrical outer surfaces 12 which oppose planar horizontal parallel outer surfaces 13 of the parts 2a as to define horizontal thin portions 14 between surfaces 12 and 13. Similarly, each of holes 5b has opposite cylindrical outer surfaces 15 which oppose planar vertical parallel outer surfaces 16 of part 2b so as to define vertical thin portions 17 between surfaces 15 and 16.

When for example, a strain is applied in the Z direction, thin portions 14 deform in opposite directions, on opposite sides thereof so that the strain gauges 7 on each side of each thin portion 14 detect different forces. On the other hand, a Y directed strain will compress or extend the thin portions 14 uniformly without bending and thus strain gauges 7 will detect no strain.

Figure 4:
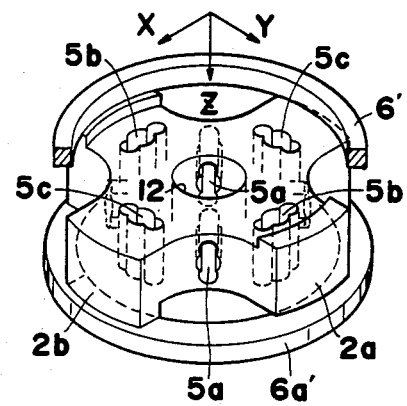

In an embodiment of FIG. 4, the parts 2a and 2b of the beam with both ends built-in are made to cross each other and formed monolithically in the same way as those of the example in FIG. 3. Where the parts 2a and 2b cross, however, a through round hole 12 is provided. The through-holes 5b and 5c are made in the parts 2a and 2b of the above-mentioned beam respectively as shown to obtain a constitution which is easy to deform by the loads in the directions X and Y, while through-holes 5a are made also in the crossing portion of the parts 2a and 2b of the above-mentioned beam to obtain thereby a constitution which is easily deformed by the load in the direction Z.

In either case, wherein the through-hole 5 is formed by connecting two round holes 3 by a connecting hole 4, the shape and dimensions of this connecting hole 4 have no effect on the characteristics of an instrument. Accordingly, the through-hole may be formed by cutting the portion between the round holes 3 in accord with the center line connecting the centers of the round holes 3 as shown in FIGS. 1-A and 1-B or in parallel to the line, or may be formed by making continued round holes in plural or a single round hole, FIGS. 3 and 4. a strain gauge 7 is to be stuck to a position as aforesaid. It is recommended to stick the same to the boundary between a circular hole part and a supporting part indicated by an alternate long and short dash line in FIG. 3 or to a position a little nearer to the side of the circular hole than the above. It is needless to say that the strain output can be obtained by composing a Wheatstone bridge of four strain gauges.

So as to confirm the effect of the present invention, the device is prepared practically on the basis of the structure shown in FIG. 3 is fitted to a part 8 to be fitted with the device by an appropriate means 9 for fitting, such as fastening bolts, while four strain gauges 7 are connected to lead wires 11 respectively through the intermediary of terminal plates 10 as illustrated in FIG. 5 and combined into a bridge, and thereby an output is obtained.

Figure 6:
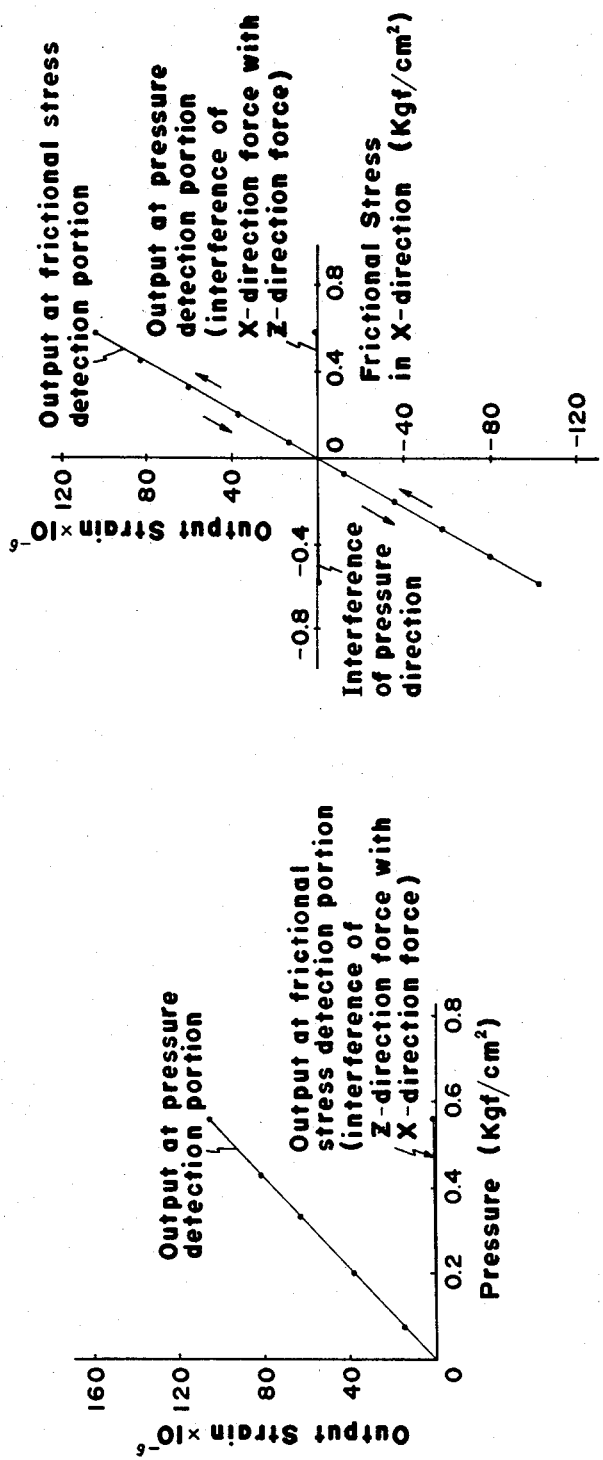

In FIGS. 6A and 6B a calibration curve thereof is plotted, which indicates very excellent linearity and that there is nearly no hysteresis at all. Moreover, the amount of interference of a force in the direction Z with an output in the direction X, as well as the amount of interference of a force in the direction A with an output in the direction Z, is very small. In addition, the eccentric load characteristic of the device is as shown in FIGS. 7A and 7B, wherefrom it is clear that the strain output shows a nearly fixed value irrespective of the degree of the eccentricity of a point of action of the load.

In addition to these excellent characteristics, the formation of the through-hole 5 is extremely easy, since the shape and dimensions of the connecting hole 4 connecting two round holes 3, have no effect on the characteristic of the instrument, and thereby labors required for preparation of the device are sharply reduced, which brings about large effectiveness in mass production thereof.

Furthermore, the present invention is featured in that the rigidity of a place of deformation can be made either large or small. When the deformation is detected by the strain gauge, in general, it is desirable that the strain output per strain gauge is on the order of at least about 1000 $\mu$st dependently on such limitations as the amplitude and S/N ratio of the pertinent electric system. Based on this, an article of embodiment according to the present invention and a known article to be compared thereto, wherein the through-hole 5 is made into a single round hole in the known device, have been prepared so as to be able to obtain the strain output of about 2000 $\mu$st, for the purpose of finding the bending on the occasion when the same load is applied thereto. The result has shown that the bending of the article of the present invention is about one ninth of that of the known article to which it was compared, in other words, it can be made to have about nine times larger rigidity than that of the latter.

Moreover, in the case when the comparison is made between embodiments relating to the present invention, the bending at the tip of an article in accordance with the invention wherein the length of the connecting hole 4 is enlarged by doubling the interval between the two round holes 3 and which is constituted so that the strain output thereof is almost the same as that of the aforesaid articles, becomes about two thirds and, accordingly, about twelve times larger rigidity than that of the aforesaid known article has been able to be given to the article in this case. Thus, the present invention is excellent in that it is capable of simply meeting various demands made according to the use of apparatuses.

While the strain output is obtained by the strain gauge in the aforesaid examples, it is a matter of course that the principles of a potentiometer, the piezoelectric effect, a differential transformer and variable inductance can be applied and that an appropriate means such as a magnetic encoder and a piezoelectric element can be used.

Although the present invention has been described with reference to the preferred embodiments, many modifications and alterations may be made within the spirit of the invention.

What is claimed is:

1. A load converter comprising:
   a detecting block having first and second opposite planar, parallel, outside surfaces and a through-hole, located between said first and second outside surfaces, extending in a first direction through said block parallel to said outside surfaces;
   said through-hole consisting of first and second cylindrical end hole portions respectively defined by first and second cylindrical surfaces in said block respectively adjacent said first and second outside surfaces, and a narrow hole portion elongated in a second direction so as to connect said first and second end hole portions;
   said block having first and second side portions on opposite first and second sides of said through-hole, extending between said first and second outside surfaces;
   said first cylindrical surface and said first outside surface, and said second cylindrical surface and said second outside surface, respectively defining therebetween respective first and second thin walled block portions, each concurrently bendably deformable at said first and second sides of said through-hole in opposite directions by strains on said block in directions perpendicular to said outside surfaces;
   said first and second side portions being substantially thicker in crosswise directions extending between each other, than said first and second thin walled portions, and said first and second outside surfaces extending in said crosswise directions distances beyond said first and second end hole portions substantially greater than the thicknesses of said first and second thin walled portions, such that the only thin walled portions adjacent said through-hole are said first and second thin walled portions, and said first and second thin walled portions are substantially rigid against deformation in response to oppositely directed forces in said crosswise directions.

2. The load converter according to claim 1, in which said detecting block has a plurality of detecting block portions for generating strain outputs against different loads in different directions, said detecting block portions being laminated monolithically and each having respective through-holes including cylindrical end portions and a narrow hole portion connecting said end portions, and respective thin walled block portions bounded by said cylindrical end portions, said respective through-holes extending in respective different directions.

3. The load converter according to claim 1, in which said detecting block has a plurality of detecting block portions for generating strain outputs against different loads in different directions, said detecting block portions being formed monolithically such that said detecting block portions extend at right angles with each other, said detection block portions each having respective through-holes including cylindrical end portions and a narrow hole portion connecting said end portions, and respective thin walled block portions bounded by said cylindrical end portions, said respective through-holes extending at right angles to each other.

4. The load converter according to claim 1, further comprising a base portion and a pressure-receiving portion, fixed at opposite ends of said detecting block in a perpendicular direction perpendicular to said first direction, said detecting block having a rectangular cross section in a plane extending in said first and perpendicular directions, said first and second outer surfaces being formed in planes respectively separating said detecting block from said base portion and said pressure-receiving portions.

5. The load converter according to claim 4, in which said base portion is annular and said pressure-receiving portion is a disc-shaped portion fixed to said detecting block only at the center of said disc-shaped portion.

6. The load converter according to claim 4, wherein said block comprises a plurality of through-holes respectively inclined with respect to each other towards an axis extending parallel said perpendicular direction through said pressure-receiving portion, said detecting block and said base portion, between said plurality of through-holes.

7. The load converter according to claim 1, in which said detecting block has grooves at constant intervals on the outer surface thereof to form a plurality of radially extended portions, recessed portions between said radially extended portions, and an aperture extending in an axial direction at a center thereof, wherein a plurality of through-holes are formed in said radially extended portions such that said plurality of through-holes extend in the axial direction of said detecting block, and in said recessed portions such that each of said plurality of through-holes in the recessed portions extend radially and terminate at said aperture.

8. A load converter as in claim 1, wherein said through-hole is a first through-hole, said detecting block having a plurality of grooves formed in the periphery of said detecting block at equally spaced intervals so as to define a plurality of radially extended detecting portions between adjacent grooves, said detecting block having a plurality of through-holes including said first through-hole in respective ones of said detecting portions, alternate ones of said plurality of through-holes extending in perpendicular directions so as to define respective pairs of thin walled portions therein at opposite ends of respective ones of said plurality of through-holes, the through-holes opening into, and the pairs of thin walled portions being bounded by, said grooves, in alternate ones of said detecting portions.

9. A load converter as in claim 1, further comprising strain gauges mounted to said detecting block at said first and second thin walled portions so as to detect bending deformation of said first and second thin walled portions resulting from strains on said block in directions perpendicular to said outside surfaces.

10. A load converter as in claim 9, wherein said strain gauges are provided on said first and second thin walled block portions at first and second sides of said through-hole.

11. A load converter as in claim 1, further comprising means for sensing bending deformation of said first and second thin walled portions resulting from strains on said block in directions perpendicular to said outside surface.

* * * * *